Feb. 13, 1962 J. J. HARRINGTON 3,020,830
DUAL CHAMBER AUTOMATIC HAY BALER
Filed May 22, 1959 3 Sheets-Sheet 3
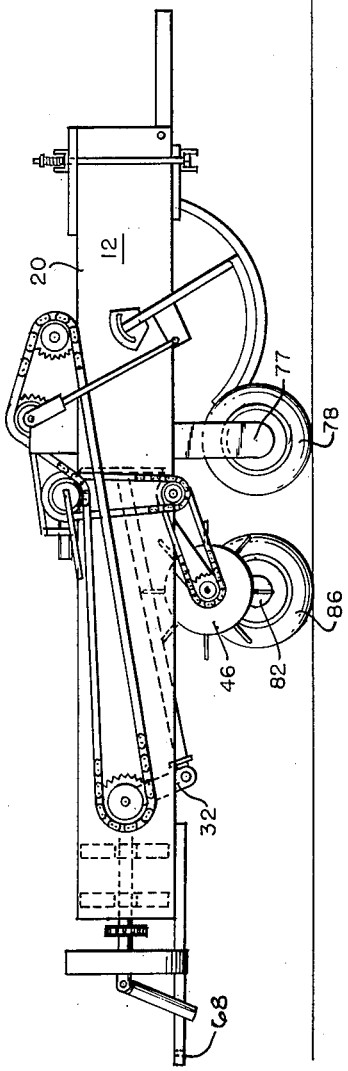
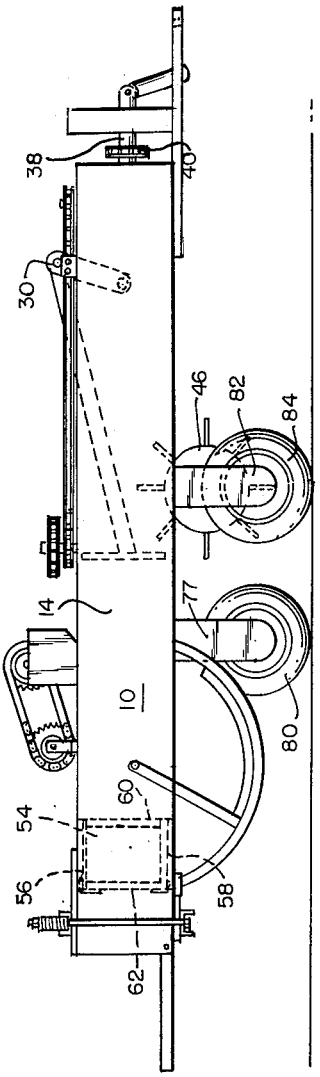
INVENTOR
Joseph J. Harrington
BY *Munn, Liddy, Daniels & March*
ATTORNEYS

United States Patent Office 3,020,830
Patented Feb. 13, 1962

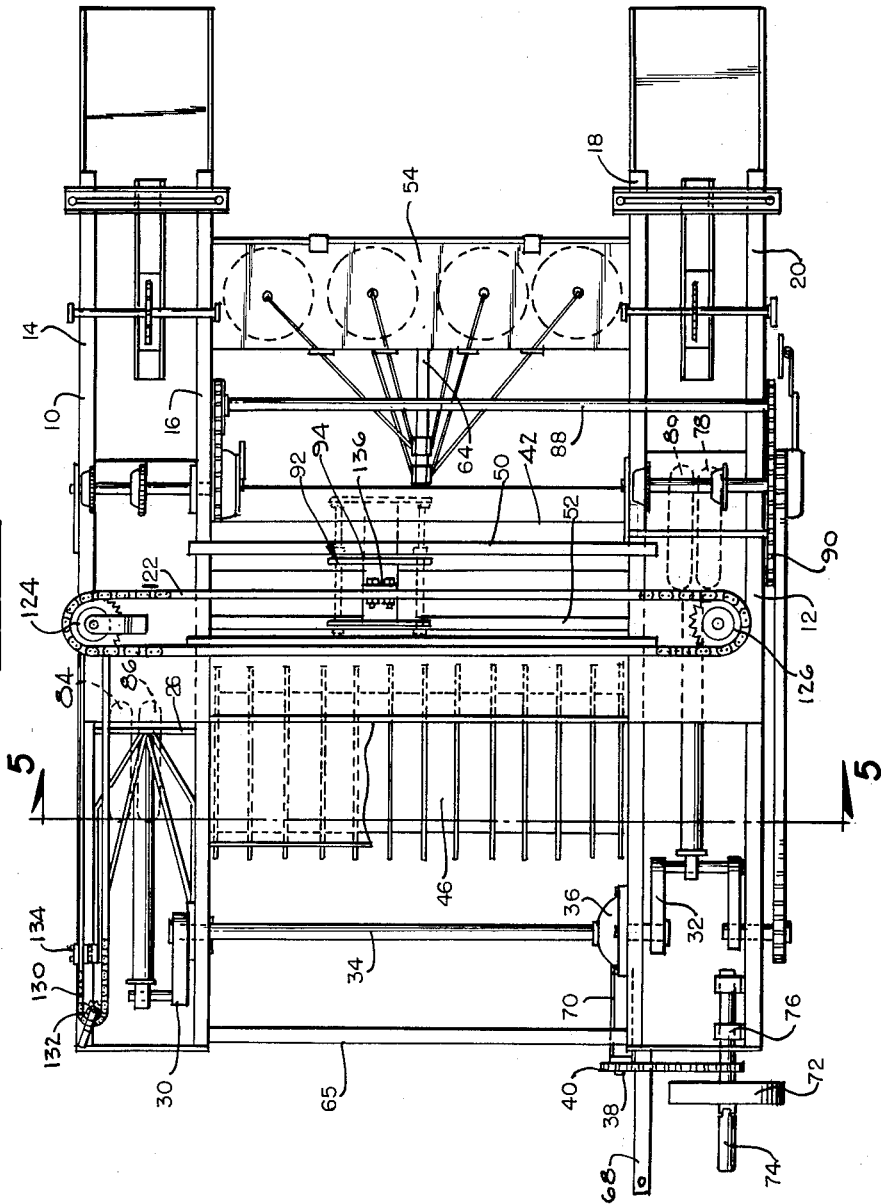

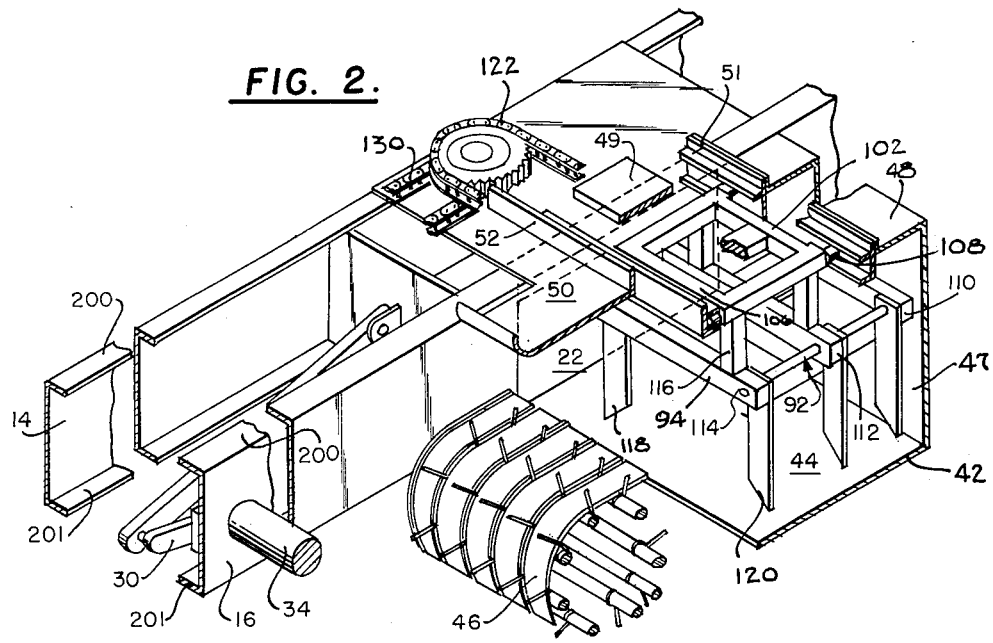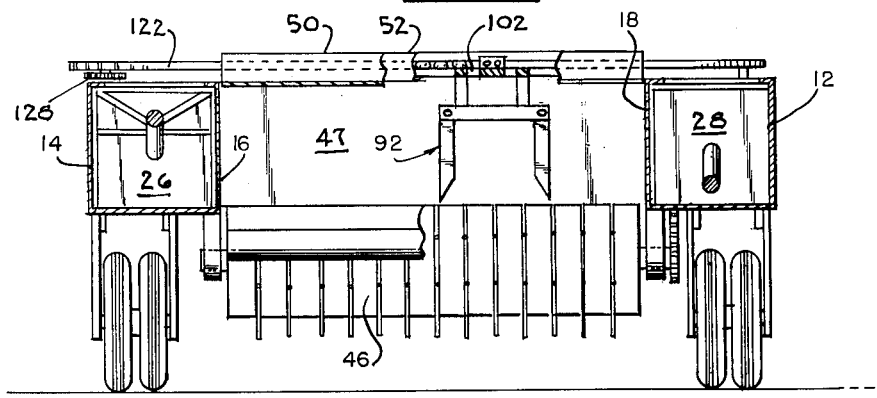
INVENTOR
Joseph J. Harrington
ATTORNEYS

3,020,830
DUAL CHAMBER AUTOMATIC HAY BALER
Joseph J. Harrington, % Harrington Mfg. Co. Inc.,
Lewiston, N.C.
Filed May 22, 1959, Ser. No. 815,041
1 Claim. (Cl. 100—209)

This invention relates to hay baling apparatus and in particular to a dual chamber baler.

Baling apparatus like all other farm equipment must be made more efficient and otherwise adapted to the more modern requirements dictated by the increasing cost of supplies and other overhead and of labor, both factory and farm. Not only the cost but particularly the scarcity of farm labor has reached the point where more and more machinery is necessary, but unfortunately machinery prices continue to rise also due to material and labor costs. In any event farm conditions are such today that it is absolutely essential that more efficient machinery be employed.

With these considerations in mind, one object of the instant invention is to provide a baler which will greatly increase the speed with which windrows of hay can be baled and decrease the time and labor needed. In fact according to the instant invention a baler capable of twice the output of known balers is possible, and less labor is required due to the increased speed.

Another object of the invention is to produce a baler as set forth in the preceding object which can be sold to farmers at a cost far less than the cost of two balers which would be capable of the same output. Thus increased output with less machinery, lower investment and less labor naturally follows.

One object of the instant invention is to provide a double or dual chambered type hay baler wherein there are two chambers for compressing the hay into bales and two knotter assemblies for binding the bales.

Yet another object of the invention is to provide such an apparatus which can be still towed by the single tractor which the average farmer employs in his operations.

A further object of the invention is to provide a dual chamber baler which is substantially of the same weight and overall size as the heretofore known balers.

One other object of the invention is to provide a dual chamber baler involving a minimum amount of structural elements and operating parts and which will be easily towed.

Still another object of the invention is to provide a dual chamber baler comprising a hay pickup and means for sweeping the hay into the chambers and wherein while one chamber is being filled the other is compressing the hay therein.

An additional object of the invention is to provide a dual chamber hay baler involving a rigid box like frame which can be suitably towed by a tractor and easily guided over the windrows of hay.

Another object of the invention is to provide a dual chamber hay baler having a pair of chambers one on each side of the baler and a pickup means intermediate the chambers which has a road clearance laterally of the baler no greater than that of heretofore known balers. In fact the instant baler will be narrower than many heretofore known balers of the single chamber type.

Still another object of the invention is to provide a pair of hay baling chambers in a baler mounted in parallel relationship with a pickup means and a hay platform and sweep chamber intermediate them and wherein the baling chambers, pickup means and platform, and sweep chamber cooperates with other framing elements to provide a relatively light yet exceptionally strong easily towed baler.

It is still another object of my invention to provide a dual chamber hay baler forming a substantially rigid box like frame having a relatively centrally positioned hay sweep chamber forming part of the structural portions of the frame and contributing to its rigidity and also having an enclosed housing for twine which is formed as a part of the frame of the baler and greatly increases its strength without increasing the height.

Yet another object of the invention is to provide a hay baler construction which is light and strong as set forth in the preceding objects and wherein a single drive takeoff is all that is needed for driving both bale chambers.

A still further object of the invention is to provide a wheel mounting system for hay balers wherein the wheels do not transgress outwardly beyond the sides of the baler and thus the road clearance is improved, and wherein better stability in towing the baler is achieved.

One other object of the invention is to provide a hay baler which is adapted to relatively neat and attractive overall appearance.

Still another object of the invention is to provide two dual knotter drives from a single power takeoff, and also simplicity of structure yet extreme reliability of performance which is in turn due to simplicity of operating elements and interconnections.

The objects also include utilization of the operating connections and other elements as a means of improving the appearance, increasing structural strength and decreasing the size of the baler.

These and other objects and advantages will become apparent from the following description and the accompanying drawings wherein:

FIGURE 1 is a top plan view of a baler constructed in accordance with the instant invention.

FIGURE 2 is a fragmentary perspective view.

FIGURE 3 is a side elevational view.

FIGURE 4 is a side elevational view taken from the other side of the baler.

FIGURE 5 is a sectional view taken along line 5—5 of FIGURE 1.

Referring now in particular to the drawings:

A hay baler constructed in accordance with the instant invention comprises a left bale chamber 10 and a right bale chamber 12. The bale chambers are constructed similarly to previously known bale chambers and each of these bale chambers is formed by elongated side members 14, 16, 18 and 20, respectively. These side members are channel shaped members usually preferably formed of a single piece of sheet steel deformed to provide upper 200 and lower 201 parallel flanges as illustrated in FIGURES 1 and 2. The bale chambers have hay inlet side openings (such as 22 as shown in FIGURE 2), into which the hay is adapted to be introduced into the chambers. Each chamber further receives one of the plunger heads 26 and 28. Plunger heads 26 and 28 are each provided with pitman and crank mechanism. The cranks 30 and 32 of the plunger heads are connected to a longitudinally extending shaft 34. Shaft 34 is mounted in suitable bearings and extends through a gear box 36. The bearings and gear box are supported on the channels 16 and 18, and the shaft cooperating with the bearings, forms a part of the rigid structural interconnection of the two bale chambers. Note that the cranks 30 and 32 are 180 degrees out of position with respect to each other. The gear box comprises a bevel gear secured to the shaft and a pinion enmeshed with the bevel gear. The pinion has a shaft 38 extending forwardly. The shaft 38 carries a sprocket 40.

Adjacent the bale chamber side openings there is provided a hay platform and sweep chamber 42. This chamber and platform is formed by a platform base 44 extending rearwardly from the pickup 46, a rear wall 47, top wall members 48, 49 and 50, and a pair of spaced track supports 51 and 52. These members are all rigidly secured to the bale chambers and extend laterally between them. They form a substantially central brace connecting the two chambers. Rearwardly of the chambers there is provided a twine box 54. This has a rectangular cross section and comprises upper and lower members 56 and 58 and front and rear members 60 and 62. The upper and lower members extend substantially flush with the upper and lower flanges respectively of the spaced parallel bale chambers and the upper and lower and front members are rigidly secured to the latter members. The rear member of the box however constitutes a cover and is provided with a hasp and hinges for permitting access to the box for placement of the twine. The top of the box has suitable spaced openings for the twine and friction clamps to place tension on the twine. A brace member 64 extends between the twine box and the rear wall of the platform and sweep chamber. A frame bar 65 extends laterally between and is rigidly secured to the chambers at their forward ends.

The pickup means 46 is received between the two bale chambers and is positioned immediately adjacent the platform portion. The pickup means is designed to deposit the hay on the platform 44. A hitch bar 68 is connected to the under side of the baler adjacent one inner side 18 of a bale chamber. The gear box 36 and a shaft support 70 for the shaft 38, which is connected to the gear box, are received partially within a cut-out opening in the wall 18.

A flywheel and power takeoff shaft 72 and 74 are journaled in the bale chamber 12 by brackets 76.

Spaced axle brackets 77 are mounted under the bale chamber 12 to the rear of the hay pickup 46. These support a shaft on which is mounted a pair of road engaging wheels 78 and 80. The opposite bale chamber has similar brackets 82 which support a similar pair of road engaging wheels 84 and 86. It is noted that the road engaging wheels and the structure supporting them on the bale chambers are received within the lateral confines of the baler and do not add to the width of the baler.

It should be particularly noted that the pair of wheels on the side opposite that to which the hitch bar is connected is supported forwardly of the pair on the opposite side. This increases the stability of the baler.

The knotters are supported over the bale chambers in the usual manner and are cross connected by a single shaft 88. The knotters are driven by means of chain drive connections 90. The flywheel is connected to the sprocket 40 by similar chain drive means.

Frame bar 65 cooperates with twine box 54 and the platform and sweep chamber to provide a rigid box like frame. This makes it possible to use light weight sheet members in forming the baler without specially formed heavy sections or channels other than those usually employed in bale chambers. The whole results in a very light baler which can be easily towed and yet which is extremely rigid and can withstand the towing torque which, as pointed out heretofore, is applied by a single tractor attached to one side of the baler. The twine box and frame bar, as well as the shaft 34, securely interconnects the two bale chambers and permits the operation of the two presses by a single drive takeoff and shaft as well as the operation of the paired knotters from a single drive.

The sweep chamber it should be noted is positioned substantially adjacent the longitudinal center of the baler with the pickup being positioned to the front of the chamber and being adapted to sweep the hay upwardly into the sweep chamber. Means are provided within the sweep chamber for sweeping the hay into each of the baling chambers. Such means is generally indicated by reference numeral 92.

The hay platform and sweep chamber 42 comprising the platform base 44 and the rear wall 47 is positioned substantially in alignment with the bottom edge and the rear edge respectively of both the bale chamber inlet openings. The sweep means 92 comprises a sweep device 94 which is positioned with respect to the platform and sweep chamber, and the hay inlet openings, so that it can be moved across the platform within the chamber to sweep the hay into both of the bale chambers. According to the invention the sweep means further includes the pair of rails 51 and 52. These extend laterally between the two bale chambers 10 and 12 and rigidly interconnect the latter. They are positioned adjacent the forward and rear edges of the bale inlet openings. The rails are channel like members providing facing tracks 100.

The sweep device 94 comprises a sweep frame 102 which is movably supported in these tracks. The frame in the form illustrated comprises a pair of lateral members (such as 106) each of which supports a roller 108 at each of its ends. The rollers are supportingly engaged with the bottom of the tracks and are of a size as to be freely movable lengthwise of the tracks. However, the rollers are only slightly smaller in diameter than the height of the tracks. This eliminates tilting of the frame. The sweep frame has longitudinal members 110, 112 and 114 depending therefrom and connected thereto by vertical frame members such as 116. Spaced longitudinally aligned feed finger sets 118 and 120 are attached to the longitudinal frame members. The finger sets extend downwardly closely adjacent the sweep platform and are adapted to move across said platform to sweep the hay alternately into one chamber and then into the other bale chamber.

The means for moving the hay sweep mechanism across the sweep platform and the sweep chamber comprises a chain 122 and a pair of sprockets 124 and 126 at opposite sides of the sweep chamber. Sprocket 124 is fixedly connected to sprocket 128. The latter is connected by a chain 130 to a sprocket 132. Chain 130 is fixedly secured at one point to the plunger head 28 by means of the bracket 134 and the chain 122 is fastened to the frame 102 by another clamp means 136. It is apparent that as the plunger 28 oscillates the sweep frame 102 also oscillates. Proper timing is obtained by adjusting the sweep frame along the chain 122 until it is found that the sweep frame fingers are at their maximum inward movement with respect to each chamber while the plunger head of the latter chamber is at its maximum retraction. By proper selection of the gearing the full width of the sweep chamber is swept and the sweep frame fingers are in their maximum inward position with respect to the opposite bale chambers when the respective plunger heads are at their maximum retracted positions. One form of the sweep chamber and sweep device, as well as its driving connections, together with the other operating structure (of the instant baler) is described and claimed in copending application Serial No. 818,084, filed June 4, 1959.

From the foregoing it will be apparent that I have provided a dual chamber hay baler structure involving the minimum number of parts and yet providing also a rigid rectangular box like frame offering no exterior obstructions, which has a minimum road clearance, which will have stability in towing, and which can be formed of light weight metal elements. The baler is designed so as to constitute a rigid frame having substantially four structural sides spaced outwardly from the center to provide the maximum rigidity against stresses.

The unique manner in which the twine chamber is supported and formed as an integral part of the structure should be particularly noted. The twine box cooperates with the forward frame bar and the shaft 34 to fix the bale chambers relative to each other on both sides of the sweep chamber and platform. Together these three elements and the baling chamber form the substantially rectangular bale frame. This frame is rigid longitudinally and laterally and fore and aft. It can be towed or pushed from either side of either end or centrally of each end without distortion. Yet it is of simple light weight construction.

The baler is adapted to be drawn by a single tractor placed in front of one bale chamber to provide adequate field of vision for the operator in controlling the passage of the pickup means relative to the windrow.

While I have shown and described a preferred form of my invention, it will be understood that many changes in form can be accomplished and that I claim an exclusive right to all apparatus coming within the appended claim.

I claim:

In the known hay baler construction comprising a pair of parallel baling chambers, a pair of plunger heads oscillatable in each of said chambers, a crank arm arrangement for oscillating said plunger heads means interconnecting said plunger heads for timed operation of one with respect to the other, including means interconnecting one plunger head so that it is at its maximum compression stroke while the other plunger head is at its maximum retracted position, a hay sweep platform and chamber interconnecting said bale chambers, each of said bale chambers having hay inlet openings in substantial alignment with ends of said sweep chamber and platform, a hay sweep mechanism movable across said sweep platform and chamber for alternately compacting hay into each of said bale chambers in timed relationship with the plunger head positioned in both of said chambers, said hay sweep mechanism comprising spaced apart sets of finger means, each of said sets of finger means being cooperable with one of said bale chambers, the improvement which comprises the vertical sides of each of said chambers having forward extensions which extend for a considerable distance beyond the forward-most position of said plunger heads and said hay inlet openings, each pair of said forward extensions being shaped so as to provide a lateral flange along substantially the entire length of the crank arm arrangement which is utilized to cause said plunger heads to move in an oscillating manner, each pair of forward extensions being rigidly interconnected at their forward-most ends, the inboard side of each forward extension being rigidly interconnected at their forward-most ends, the vertical sides of each of said baling chambers having rearward extensions which extend rearwardly from said hay inlet openings a distance which is approximately equal to the distance which said forward extensions extend forwardly of said hay inlet openings, the rearward-most ends of the inboard sides of said rearward extensions being rigidly interconnected, whereby a hay baler having a box-like frame is produced which can be easily towed, is extremely rigid, and which can withstand the towing torque applied by a single tractor attached to one side of the baler, said means for rigidly interconnecting the said rearward-most ends of the inboard sides of said rearward extensions comprising an elongated bale twine box, said twine box being substantially perpendicular to said rearward extensions, and said means interconnecting said plunger heads for timed operation including a driving connection extending laterally between said bale chambers, said driving connection being journaled in said forward extension of each of said chambers, gear means connected to said driving connection, said gear means having a driving element extending forwardly of said baler at one side thereof, a power takeoff device connected to said element and adapted to be connected to a tractor power takeoff.

References Cited in the file of this patent
UNITED STATES PATENTS

| | | |
|---|---|---|
| 368,393 | Hannay | Aug. 16, 1887 |
| 405,034 | Hooton et al. | June 11, 1889 |
| 837,540 | Bonwell | Dec. 4, 1906 |
| 1,003,371 | Rayon | Sept. 12, 1911 |
| 2,884,850 | Nolt | May 5, 1959 |